United States Patent [19]
Okafuji

[11] Patent Number: 5,907,325
[45] Date of Patent: *May 25, 1999

[54] PROCESSING APPARATUS FOR PROCESSING VIDEO IMAGES HAVING REMOVABLE STORAGE MEMORY

[75] Inventor: Takayuki Okafuji, Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/627,467

[22] Filed: Apr. 4, 1996

[30] Foreign Application Priority Data

Apr. 7, 1995 [JP] Japan .................................. 7-108305

[51] Int. Cl.$^6$ .................................................. G06F 3/00
[52] U.S. Cl. ............................................................ 345/333
[58] Field of Search .................................. 395/333, 334; 345/172, 333, 334, 339, 348, 349, 354, 329, 328

[56] References Cited

U.S. PATENT DOCUMENTS

| | | | |
|---|---|---|---|
| 4,107,784 | 8/1978 | Van Bemmelen | 345/337 |
| 4,200,913 | 4/1980 | Kuhar et al. | 341/23 |
| 4,663,704 | 5/1987 | Jones et al. | 364/188 |
| 4,901,364 | 2/1990 | Faulkerson et al. | 382/313 |
| 5,129,057 | 7/1992 | Strope et al. | 395/348 |
| 5,237,657 | 8/1993 | Pearman et al. | 345/172 |
| 5,258,748 | 11/1993 | Jones | 345/172 |
| 5,414,328 | 5/1995 | Hunt et al. | 315/316 |
| 5,486,846 | 1/1996 | Comer et al. | 345/172 |
| 5,488,575 | 1/1996 | Danielson et al. | 364/707 |

OTHER PUBLICATIONS

Cowart, R., "Mastering Windows 3.1" SYBEX, pp. 346–347, 1992.

*Primary Examiner*—A. Katbab
*Attorney, Agent, or Firm*—Frommer Lawrence & Haug, LLP.; William S. Frommer; Dennis M. Smid

[57] ABSTRACT

A processing apparatus capable of easily giving compatibility to corresponding information and thereby improving efficiencies of operations in a plurality of processing apparatus. Corresponding information set in a processing apparatus is written in storing means and an image processing function assigned to each operation key is changed in accordance with the corresponding information read into the processing apparatus from the storing means. Thereby, it is possible to easily give compatibility to the corresponding information and resultingly, improve efficiencies of operations in a plurality of the processing apparatuses.

15 Claims, 6 Drawing Sheets

PROCESSING APPARATUS FOR PROCESSING VIDEO IMAGES HAVING REMOVABLE STORAGE MEMORY

BACKGROUND OF THE INVENTION

1. Field of the Invention

This invention relates to a processing apparatus and, more particularly, is applicable to a processing apparatus used to edit images.

2. Description of the Related Art

This type of processing apparatus is conventionally used for various purposes for processing images such as edition of images, transmission of broadcast, and copying. The processing apparatus forms and outputs the video information signal which is processed by processing the input video information signal in accordance with a predetermined processing procedure.

Figure 1:
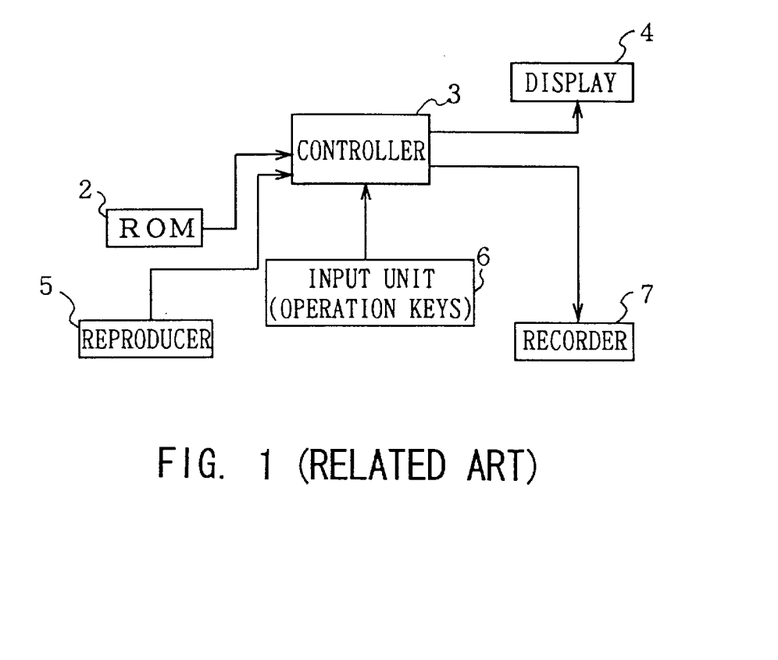
FIG. 1 is a block diagram showing a conventional processing apparatus.

That is, as shown in FIG. 1, a controller 3 reading an initialization program output from a ROM (read only memory) 2 executes a setting procedure according to the program when a processing apparatus 1 is started so as to display predetermined functional items and setting contents on the screen of a display 4. Moreover, a reproducer 5 outputs a video information signal to be image-processed to the controller 3 and also outputs the signal to a monitor (not illustrated) connected to the reproducer 5 so as to display an image on the monitor.

An operator confirms a portion to be image-processed of the image displayed on the monitor (not illustrated) by observing the image and selects a desired image processing function out of the predetermined functional items displayed on the screen of the display 4 to operate an input unit (hereafter referred to as operation keys) 6. The operation keys 6 output a command signal corresponding to the selected image processing function to the controller 3 by being pressed by the operator.

Moreover, the controller 3 inputs the command signal output from the operation keys 6, image-processes a video information signal input from the reproducer 5 by the image processing function corresponding to the input command signal, and outputs the image-processed signal to a recorder 7. The recorder 7 records the image-processed video information signal output from the controller 3. Here, whenever receiving the command signal, the controller 3 reads an image processing function processing procedure corresponding to the command from the ROM 2.

Thus, the processing apparatus 1 image-processes the input video information signal by an image processing function desired by the operator and records the image-processed video information signal by the recorder 7.

In this type of processing apparatus 1, functions to be used depend on the purpose. For example, the operation requiring fine edition in image edition uses a lot of functions but a simple edition uses a small number of functions. Therefore, a small number of operation keys 6 are enough for practical use in a simple edition. Moreover, functions used for edition are hardly used for other image processing (e.g. transmission of broadcast) but operation is executed by using other functions (e.g. switcher) instead.

That is, a lot of functions for editing an image are unnecessary for simple edition or transmission of broadcast. However, these unnecessary operation keys 6 are adjacent to other operation keys 6 used for operations. Therefore, if the operator erroneously presses one of these unnecessary keys, the image processing function corresponding to the key is executed. Thus, the unnecessary operation keys 6 cause the operator to perform erroneous operations. Moreover, in general, respective functions have setting contents for regulating the functions, the change of the setting contents according to environment for executing the functions (characteristics of input signal, type of tape for editing and purpose of edition, etc.) is necessary.

For this reason, in this type of processing apparatus 1, it is possible to change the corresponding relations between each image processing function and each operation key 6 and delete unnecessary functions by changing pieces of setting information (hereafter referred to as corresponding information) showing which image processing function is assigned to which operation key 6 or what about setting contents of respective image processing functions in accordance with the instruction input by the operator. In this connection, a changed piece of corresponding information is stored in a storage circuit (not illustrated) in the processing apparatus.

Thus, the processing apparatus 1 allows an operator to assign each image processing function to each operation key 6 so that the operator easily performs operations by changing pieces of corresponding information in accordance with the purpose. Thereby, the processing apparatus 1 allows the operator to perform image processing by easy operations and makes it possible to prevent erroneous operations.

However, the processing apparatus 1 comprising the above structure has the problem that a piece of corresponding information set by an operator can be stored only in the processing apparatus. That is, the correspondence between each image processing function and each operation key 6 set by a processing apparatus is inherent in the processing apparatus.

An operator changes a piece of corresponding information which is able to be combined in various ways into a combination decided as being suitable to perform an operation. Therefore, when the image processing is tried to continue by using another processing apparatus, after the image processing is performed by a processing apparatus up to the middle, in case the image processing has been already used for another purpose or used by another operator, piece of corresponding information is not generally a combination decided as being suitable in an image processing to be continued. Therefore, the former processing apparatus is different from the latter processing apparatus in the image processing function and the setting contents corresponding to each operation key 6 and it is difficult for the operator having been operating the former processing apparatus to operate the latter processing apparatus.

Thus, because each processing apparatus is set so that an operator operating the processing apparatus can easily operate the processing apparatus, the operating method of each processing apparatus is not compatible.

For this reason, when an operator having been operating a processing apparatus operates another processing apparatus, the operator has to change pieces of corresponding information in order to operate the latter processing apparatus by the same operating method as that of the former processing apparatus. However, changing pieces of corresponding information whenever changing processing apparatuses makes operations troublesome, and resultingly, causes the operator to perform erroneous operations and decreases the operation efficiency.

SUMMARY OF THE INVENTION

In view of the foregoing, an object of this invention is to provide a processing apparatus in which in a plurality of processing apparatuses, the efficiency of operations can be improved.

The foregoing object and other objects of the invention have been achieved by the provision of a processing apparatus having a plurality of image processing functions and a plurality of operation keys respectively corresponding to each of the plural image processing functions, and executing a processing by a corresponding image processing function by pressing a predetermined operation key, in which corresponding information stored in storing means is read into the processing apparatus through input/output means and the corresponding information set in the processing apparatus is written in the storing means through the input/output means.

Corresponding information set in a processing apparatus can be written in storing means and an image processing function assigned to each operation key is changed in accordance with the corresponding information read into the processing apparatus by the storing means. Thereby, this enables the corresponding information to easily have compatibility and resultingly improve the efficiency of operations by a plurality of processing apparatuses.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 2:
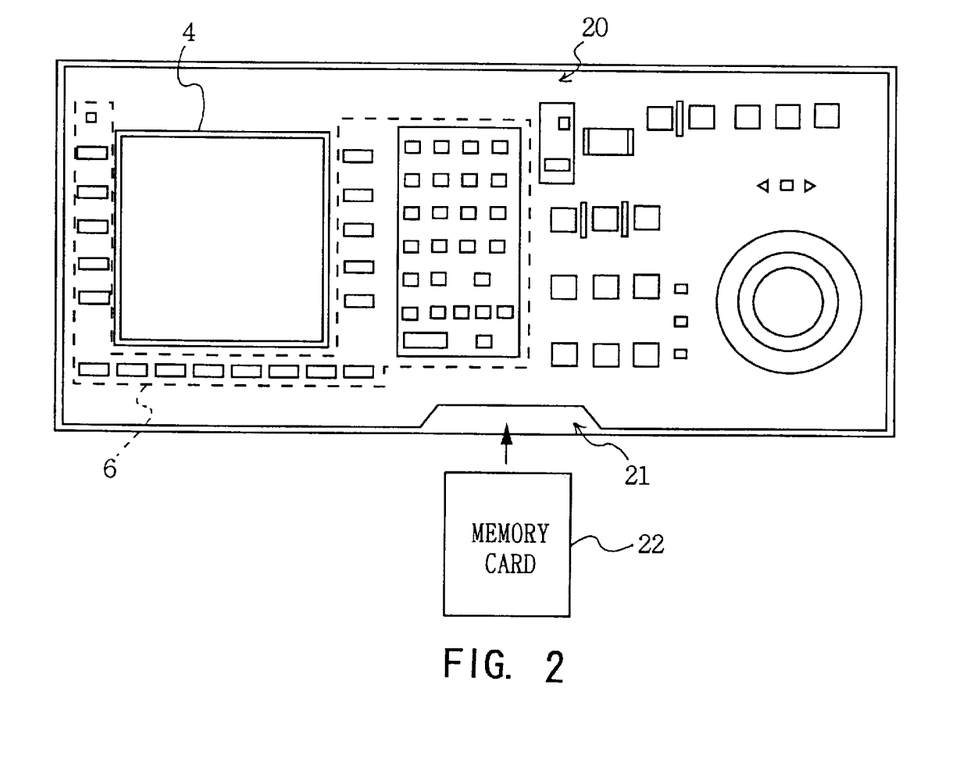
FIG. 2 is a schematic diagram showing the operation panel of the processing apparatus of the present invention.
Figure 3:
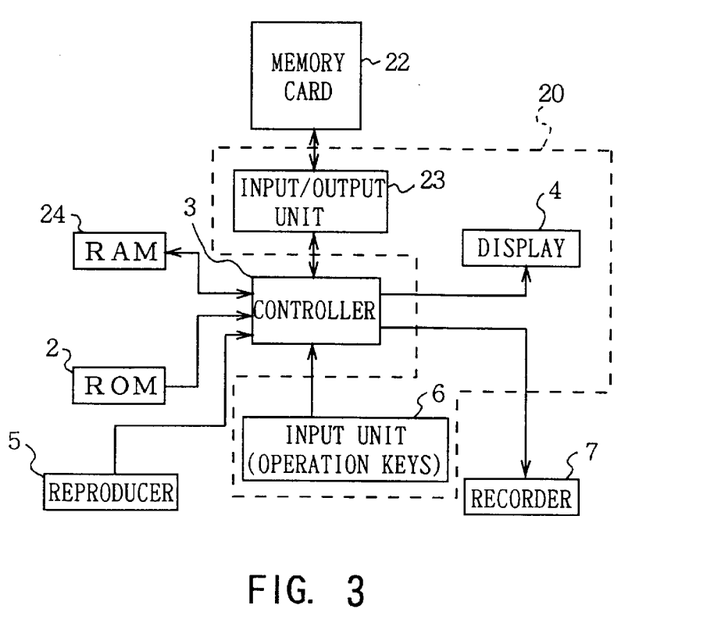
FIG. 3 is a block diagram showing the processing apparatus of the present invention.

Preferred embodiments of this invention will be described with reference to the accompanying drawings:
(1) Structure of Operation Panel FIG. 2 shows an operation panel 20 of a processing apparatus 10 having a plurality of image processing functions and a plurality of operation keys 6 respectively corresponding to each of the image processing functions and executing a processing by each image processing function corresponding to each operation key 6 by pressing a predetermined operation key 6, in which the processing apparatus 10 can be operated by a command signal output from the operation panel 20.

That is, the operation panel 20 allows a display 4 to display the functional items of image processing functions on the screen and makes it possible to input a command signal corresponding to a selected functional item to the processing apparatus 10 (FIG. 3) by operator's selecting a displayed functional item and manipulating the input unit 6 (hereinafter referred to as operation keys 6). Moreover, the display 4 can selectively change the screen for displaying functional items and setting contents and the screen for displaying corresponding information by pressing a selection key (PF1 in FIG. 4) to display it.

Moreover, slot-type input/output means (hereafter referred to as a slot) 21 allows an operator to set or remove a memory card 22 to or from the slot 21 and makes it possible to electrically connect the memory card 22 with an input/output unit 23.

Thus, the operation panel 20 makes it possible to selectively input a command signal corresponding to a desired image processing function to the processing apparatus 10 by manipulating the operation keys 6. Moreover, the operation panel 20 makes it possible to input or output data between the input/output unit 23 and the memory card 22 through the slot 21. Thereby, an operator can input or output data and command signals to or from the processing apparatus 10 through the operation panel 20.

(2) Circuit Structure in Processing apparatus

In FIG. 3 in which a portion corresponding to that in FIG. 1 is provided with the same symbols, symbol 10, as a whole, represents a processing apparatus for image processing an input video signal in accordance with a command signal output from the operation panel 20 and for outputting the signal.

The processing apparatus 10 comprises a ROM 2, a controller 3, a display 4, a reproducer 5, an input unit (operation keys) 6 and a recorder 7, which are constructed similarly to those in FIG. 1, and a memory card 22 used as storing means for recording corresponding information, an input/output unit 23 for reading the corresponding information from the memory card 22 and for writing the corresponding information previously set in the processing apparatus 10 in the memory card 22, and a RAM 24 for temporarily storing the corresponding information read out of the memory card 22. In this case, the display 4, the operation keys 6, and the input/output unit 23 are arranged on the operation panel 20 and respectively connected with the controller 3.

That is, an operator performs selective operation by the plural operation keys 6 while the memory card 22 is inserted into the slot 21 (FIG. 2), so as to read by the input/output unit 23 the corresponding information stored in the memory card 22 into the RAM (random access memory) 24 in accordance with a command signal output from the controller 3. The input/output unit 23 writes the corresponding information set in the processing apparatus 10 into the memory card 22 in accordance with operations of an operator.

The input/output unit 23 outputs the corresponding information read out of the memory card 22 to the RAM 24 and the RAM 24 temporarily stores the corresponding information. Moreover, the RAM 24 outputs the temporarily-stored corresponding information to the controller 3 in accordance with a command signal output by the controller 3. The controller 3 displays functional items and setting contents according to the corresponding information read from the RAM 24 on the display 4 and moreover, assigns an image processing function to each operation key 6 in accordance with the corresponding information.

Thus, the processing apparatus 10 displays functional items and setting contents in accordance with the corresponding information read from the memory card 22 and assigns an image processing function to each operation key 6. Thereby, the processing apparatus 10 can easily assign an image processing function to each operation key 6.

Moreover, when an operator wants to change the image processing functions assigned to the operation keys 6, the operator can change pieces of corresponding information by changing the screen on the display 4 to a set-function change screen and manipulating the operation keys 6. Moreover, the operator can store the changed corresponding information in the memory card 22 by inserting the memory card 22 into the slot 21 (FIG. 2) and manipulating each operation key 6.

Thus, the pieces of corresponding information set in the processing apparatus 10 can be changed by manipulating the operation keys 6 on the set-function change screen. Moreover, by reading the corresponding information to be written in the memory card 22 by another processing apparatus, it is possible to change the corresponding information in the memory card 22 to the corresponding information same as that in the processing apparatus 10. Thereby, the processing apparatus 10 allows an operator to optionally change pieces of corresponding information and enables the corresponding information to easily have compatibility in a plurality of processing apparatus.

In the above structure, a command signal output by pressing PF1 key serving as a selection key is output to the controller 3 and the controller 3 selectively changes the screen for function setting (FIG. 4) and the screen for function setting (FIG. 6) and displays it on the screen of the display 4.

Figure 4:
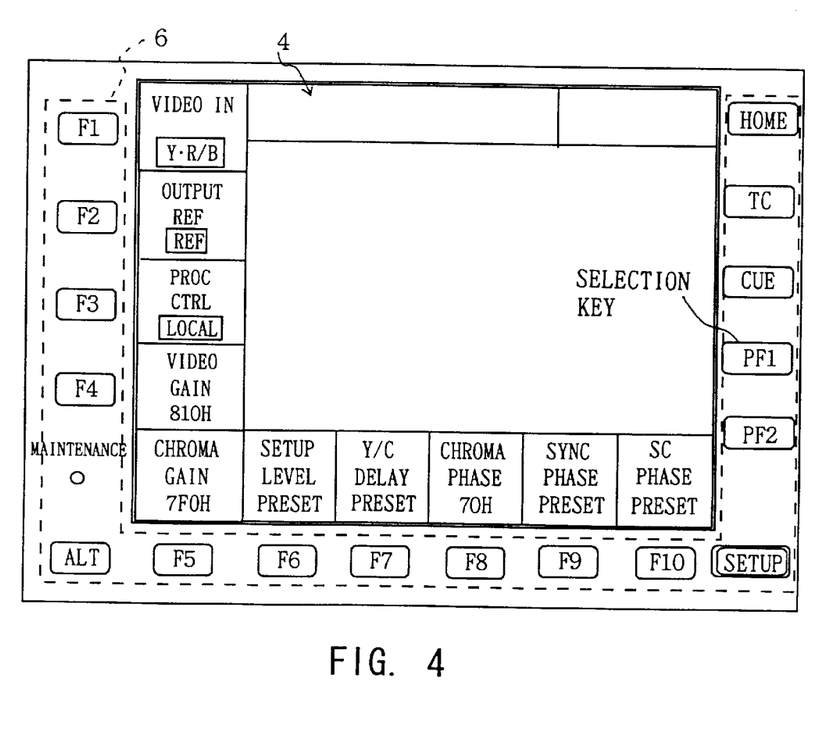
FIG. 4 is a schematic diagram explaining a menu screen for changing pieces of corresponding information (before changed)

FIG. 4 shows an example in which a function necessary for editing is assigned to respective operation keys 6. The functions and setting contents of respective operation keys 6 are displayed at respective positions corresponding to respective operation keys 6 of the display 4 in the operation panel 20.

The following functions and setting contents are respectively assigned to F1 to F10.

| [Functions] | [Setting contents] |
|---|---|
| F1 VIDEO IN | change an input video signal |
| Y · R/B | component (luminance signal and color signal separation) video |
| F2 OUTPUT REF | change a signal being reference VTR |
| REF | regard the input from REF VIDEO input terminal as reference |
| F3 PROC CTRL | change a control method of video processor |
| LOCAL | control by a local (volume knob) |
| F4 VIDEO GAIN | set an image output level |
| 810H | set in the range of 0 to B50H (hexadecimal expression) |
| F5 CHROMA GAIN | set a hue output level |
| 7F0H | sets in the range of 0 to B50H (hexadecimal expression) |
| F6 SETUP LEVEL | sets the black level of image |
| PRESET | value at the time of shipping from a factory |
| F7 Y/C DELAY | sets a delay amount of luminance/hue at the time of reproducing an analog tape (influences to color) |
| PRESET | value at the time of shipping from a factory |
| F8 CHROMA PHASE | sets the phase of a hue |
| 70H | sets in the range of 0 to FF (hexadecimal expression) |
| F9 SYNC PHASE | synchronizing signal |
| PRESET | value at the time of shipping from a factory |
| F10 SC PHASE | sets the of phase of color subcareer (color information) |
| PRESET | value at the time of shipping from a factory |

However, for example, if simple edition is performed, the other functions which are different from these functions are necessary. Therefore an operator displays on a menu screen name of respective operation keys 6, the list of functions and setting contents assigned to respective operation keys 6 at present, and the list of functions and setting contents which can be selected, and assigns the other functions to respective operation keys 6 by pressing key PF1 (FIG. 6).

An example of simple edition will be hereinafter described in the case of performing only an image input and an insert edition (operation of inserting the other signal in a basic signal) of an audio 2 channel.

Figure 6:
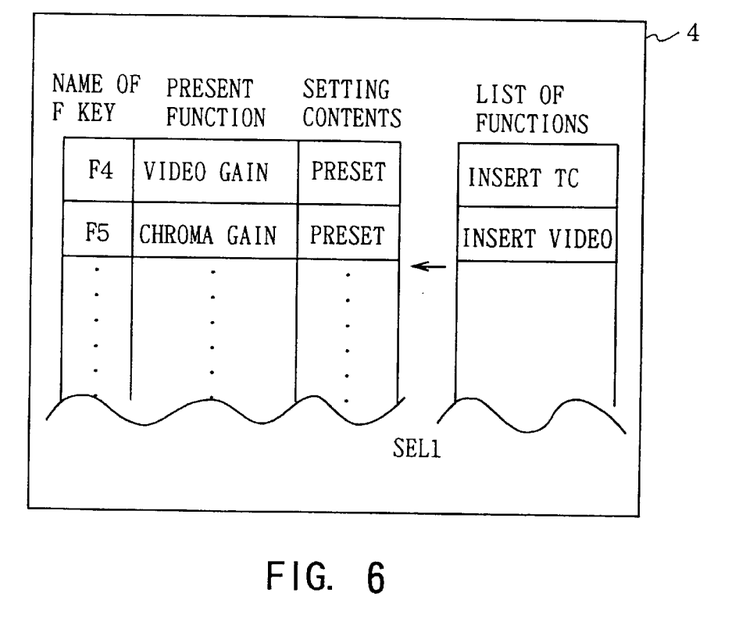
FIG. 6 is a schematic diagram explaining a menu screen for changing pieces of corresponding information (function selecting screen)

On a screen shown in FIG. 6, an operator selects the necessary functions and setting contents for the respective operation keys 6 from a list and changes the functions and setting contents assigned at present for the selected functions and setting contents.

For example, a function for setting the CHROMA GAIN (output level of a hue) is assigned now to key F5, but a function for setting the CHROMA GAIN (output level of a hue) is unnecessary in an insert edition. So, the function of insert edition for video (function for inserting the other video signal in a basic video signal) is newly assigned as the function of the key F5.

The INSERT VIDEO is selected from a list of functions as function of the key F5 in order to assign a new function.

Then, the setting contents of the function of the key F5, INSERT VIDEO, is selected. The operation keys 6 is operated, and the pointer showing the changing object is moved to the point of the present setting contents of the key F4, and the display of setting contents is changed by operating the operation keys 6. Thus the change is executed As the setting contents of the INSERT VIDEO, for example, ON and OFF are set, ON is set in order to insert a video signal in FIG. 5.

Figure 5:
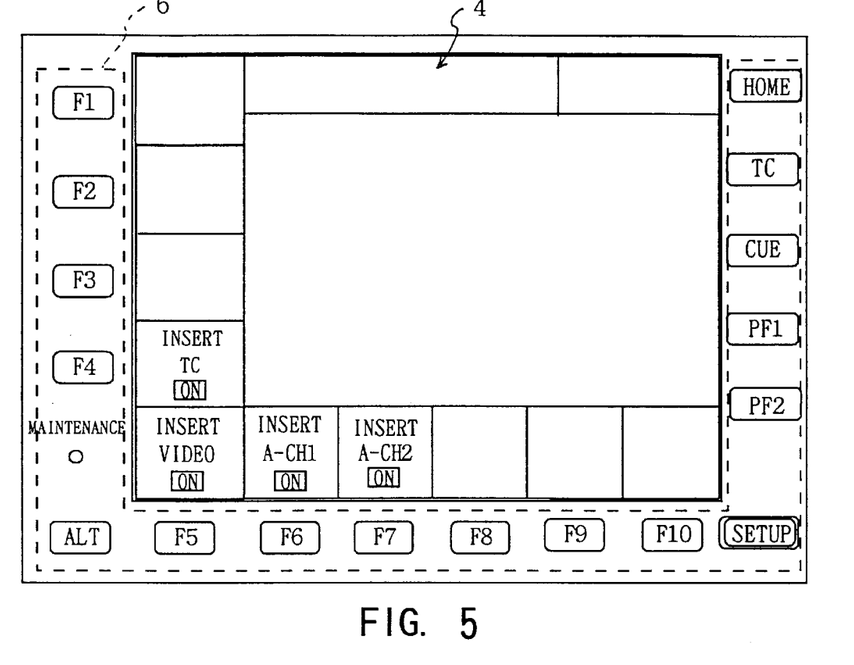
FIG. 5 is a schematic diagram explaining a menu screen for changing pieces of corresponding information (after changed)

In similar with the key F4, in the case of the keys F5 to F9, the following functions and setting contents are assigned to the keys F5 to F9 in order to execute the insert edition of the audio 2 channel (FIG. 5).

| [Functions] | [Setting contents] |
|---|---|
| F5 INSERT VIDEO | set for inserting video |
| ON | insert |
| F6 INSERT A-CH1 | set for inserting audio channel 1 |
| ON | insert |
| F7 INSERT A-CH2 | set for inserting audio channel 2 |
| ON | insert |

The setting contents of the INSERT A-CH1 and the INSERT A-CH2 also have two types, ON and OFF. ON shows a function for inserting the signal (a video signal in the case of INSERT VIDEO), OFF shows a function for not inserting the signal. For example, in the case of simple edition, insertion of a video signal and an audio channel 2 are executed at the same time, at that occasion, the audio channel 1 is not executed the inserting edition but as it is, as the case may be. In this occasion, the setting contents of the INSERT VIDEO and the INSERT A-CH2 are set to ON, and the setting contents of the INSERT A-CH1 is set to OFF.

On this occasion, the functions are not assigned to the keys F1 to F3 and F10 by the reason of getting rid of unnecessary operation keys 6 and excluding the cause of erroneous operation (FIG. 5).

As described above, it is necessary for respective operation keys 6 to be assigned functions and to select a setting content for controlling the function from a plural of setting contents However, it is troublesome operation to execute the selection of setting contents to all respective functions assigned.

Figure 7:
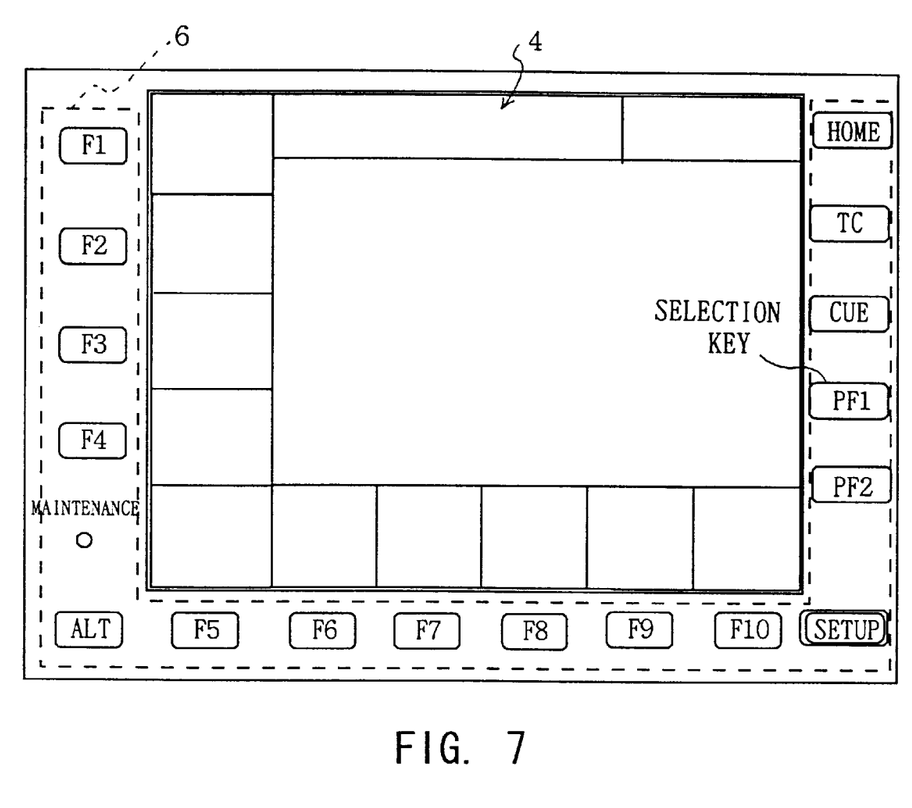
FIG. 7 is a schematic diagram explaining a menu screen for changing pieces of corresponding information (after changed)

The change of the corresponding information is the change decided as being a suitable to obtain an editing effect desired by an operator on the basis of an environment for executing a simple edition (characteristics of input signal, type of tape for editing, and purpose of edition, etc.), and it depends on the decision of respective operators. Therefore, for example, an operator may decide that functions to be displayed on the display 4 is unnecessary in the transmission of broadcast (FIG. 7).

Thus, the processing apparatus 10 can optionally change the image processing functions assigned to the operation keys 6 by manipulating the operation keys 6 while the screen is changed to the setting change screen. Thereby, the operator can change pieces of corresponding information so that the operator can easily perform image processing.

Thus, an operator executes operation after changing the corresponding information which is able to be combined in many ways to a combination decided as a suitable one. However, in the case of changing a processing apparatus, if the processing apparatus is used for another uses or used by another operator, the corresponding information is not generally a combination decided as a suitable one. It is troublesome to assign functions and setting contents to respective operation keys 6 whenever a processing apparatus is changed. So, suitable corresponding information displayed on the display 4 on the RAM 24 is stored in the memory card 22 by operating the operation keys 6 after inserting the memory card 22 to a slot.

Figure 8:
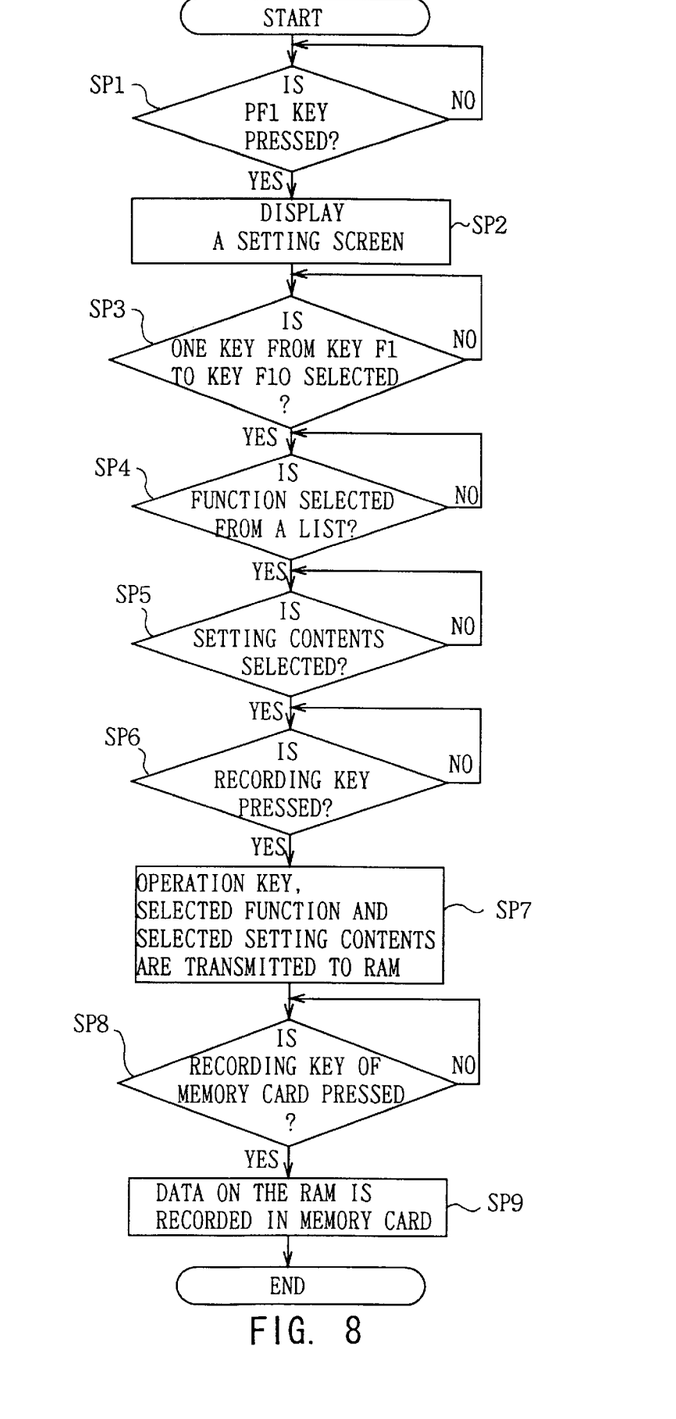
FIG. 8 is a flow chart explaining the operation to store the corresponding information desired by an operator in a memory card.

FIG. 8 will be hereinafter described.

When PF1 key is pressed (step SP1), a list of setting contents and functions assigned now and a list of functions which can be selected is displayed on the display 4 (step SP2) (FIG. 6).

One key from key F1 to key F10 is selected (step SP3), and a pointer showing a changing object is moved to the point of necessary function in the list of functions and selected by operating the operation keys 6 (step SP4). Then, a pointer showing a changing object is moved to the point of the present setting contents and selected by changing a display of setting contents by operating the operation keys 6 (step SP5). When a recording key from the operation keys 6 is pressed (step SP6), the selected operation key 6, function and setting contents are transmitted to the RAM 24 (step SP7). When a key for recording in the memory card 22 from the operation keys 6 is pressed (step SP8), the selected operation key 6, function and setting contents are recorded in the memory card 22 (step SP9).

If a processing apparatus is changed, the memory card 22 recorded the corresponding information decided as being suitable is inserted in a slot of the processing apparatus to be operated and is read.

Figure 9:
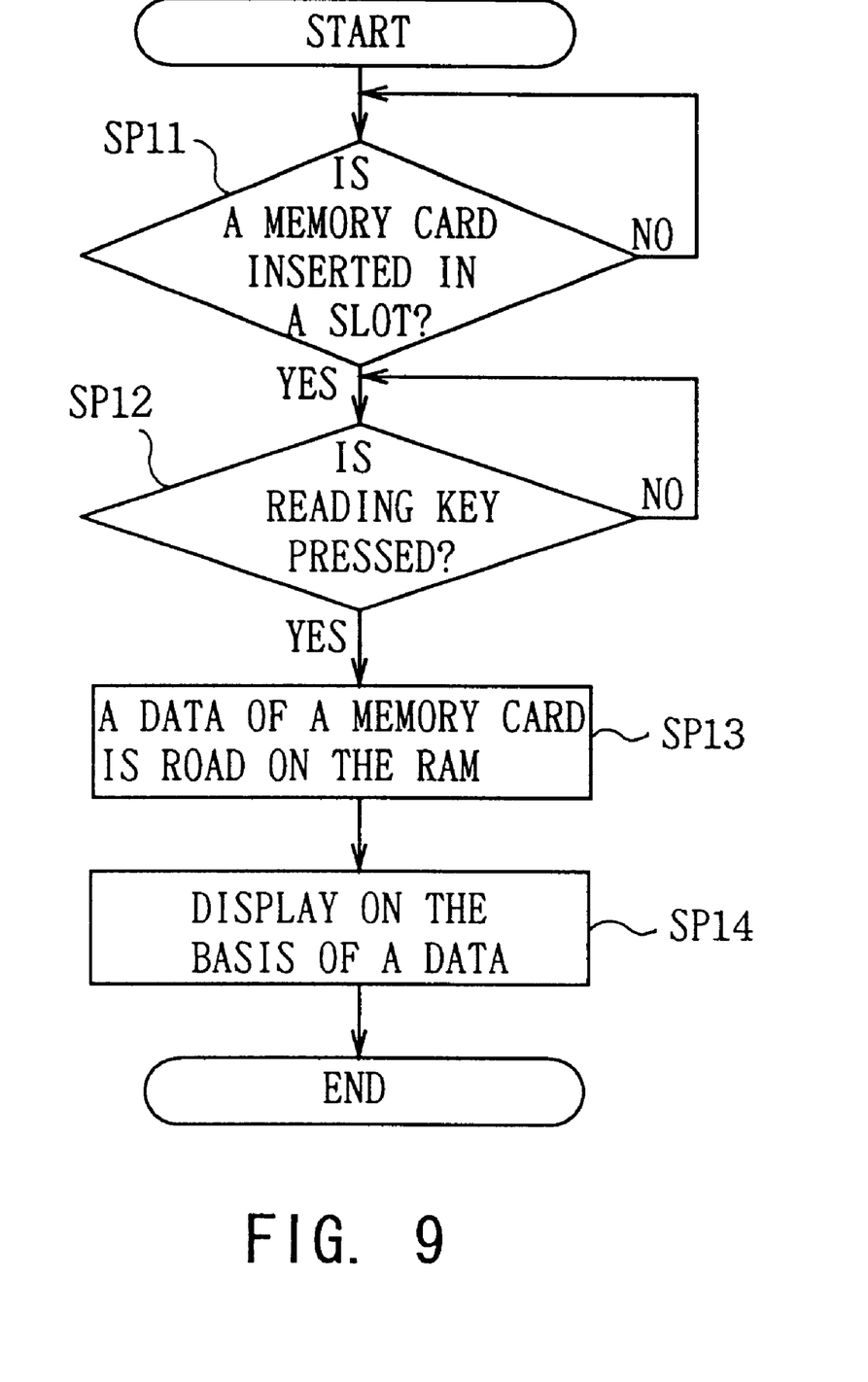
FIG. 9 is a flow chart explaining the operation to read the corresponding information desired by an operator from a memory card.

FIG. 9 will be hereinafter described

The memory card 22 is inserted in the slot 21 (step SP11), and when a reading key from the operation keys 6 is pressed (step SP12), the corresponding information which has been recorded in the memory 22 is read in the RAM 24 (step SP13). Then, functions and setting contents according to the contents of the corresponding information are displayed at the points corresponding to the keys F1 to F10 on the display 4 (step SP14).

Thus it is possible to operate according to the corresponding information which has been stored in the memory card 22.

According to the above structure, the corresponding information is stored by providing the memory card 22 and the assignment of the image processing functions to the operation keys 6 is changed in accordance with the corresponding information read from the memory card 22, so as to easily give compatibility to the corresponding information. As a result, it is possible to improve the efficiencies of edition and general operations in a plurality of processing apparatuses.

(3) Other Embodiments

For the above embodiments, a case is described in which only one type of the corresponding information set in the processing apparatus 10 is stored in the memory card 22 for recording the corresponding information showing the corresponding relations with a plurality of operation keys 6 for one image processing functions. However, the present invention is not limited to the above case, but it is also possible to store a plurality of pieces of corresponding information showing the differently-set corresponding relations in one memory card 22. Thereby, the processing apparatus 10 allows an operator to easily change pieces of corresponding information in accordance with purposes such as simple edition and transmission of broadcast.

Moreover, in the above described embodiments, the memory card 22 is inserted into a slot, thereby corresponding information stored in the memory card 22 being read into the processing apparatus. However, the present invention is not limited to this, but for example, signal transmitting means by using a radio transmission method such as infrared radiation can be provided in the memory card 22 or an input/output unit 23 used for reading or writing pieces of corresponding information from or into the memory card 22 so as to perform writing and reading the corresponding information by radio transmission. Thereby the memory card 22 can be improved in its durability and operativity because it is not required to be set or removed whenever a processing apparatus to be used in the operation is changed and the memory card 22 can be formed in any shape. In addition, space corresponding to a unit used for reading the memory card 22 can be efficiently utilized because such unit becomes unnecessary.

As described above, according to the present invention, pieces of corresponding information set in a processing apparatus is written into storing means and an image processing function assigned to each operation key is changed in accordance with the corresponding information read from the storing means. Thereby, it is possible to easily give compatibility to the corresponding information and resultingly realize a processing apparatus capable of improving efficiencies of operations in a plurality of processing apparatuses.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A processing apparatus for processing video images, said processing apparatus having a plurality of operation keys, each operation key assigned to one of a plurality of processing functions for processing video images, said processing apparatus comprising:

input/output means for receiving a removably insertable storing means and for storing therein corresponding information indicating a reassignment between a respective operation key and a respective processing function and for reading stored corresponding information from said storing means;

display means for displaying said corresponding information; and means for reassigning said respective operation key to said respective processing function in accordance with the corresponding information read from said storing means by said input/output means;

wherein, a plurality of users reassign by operation of said means for reassigning said operation keys to said processing functions in accordance with said storing means with different reassignments for each user to thereby prevent erroneous operation of said processing apparatus by said plurality of users.

2. The processing apparatus according to claim 1, wherein said storing means stores a plurality of sets of corresponding information of said operation keys to said processing functions.

3. The processing apparatus according to claim 2, wherein:

said processing apparatus processes a video signal;

said storing means comprises a memory card; and a list of functions, which can be assigned to respective operation keys, is displayed in order to change a corresponding relation between said processing functions and said operation keys.

4. The processing apparatus according to claim 1, wherein:

said processing apparatus processes a video signal;

said storing means stores a plurality of sets of said corresponding information which are different in the corresponding relation between said processing functions and said operation keys; and a list of functions, which can be assigned to respective operation keys, is displayed in order to change corresponding relation between said operation keys and said processing functions.

5. A processing apparatus for processing video images, said processing apparatus having a plurality of operation keys, each operation key assigned to one of a plurality of processing functions for processing video images, said processing apparatus comprising:

input/output means for receiving a removably insertable storing means and for storing therein corresponding information indicating a reassignment between a respective operation key and a respective processing function and for reading stored corresponding information from said storing means;

display means for displaying said corresponding information; and means for reassigning said respective operation key to said respective processing function in accordance with the corresponding information read from said storing means by said input/output means;

wherein, a plurality of users reassign by operation of said means for reassigning said operation keys to said processing functions in accordance with said storing means with different reassignments for each user to thereby prevent erroneous operation of said processing apparatus by said plurality of users.

6. The processing apparatus according to claim 5, wherein said storing means comprises a memory card.

7. The processing apparatus according to claim 5, wherein said processing apparatus processes input video signals in response to selection of said operation keys.

8. The processing apparatus according to claim 7, wherein said storing means comprises a memory card.

9. The processing apparatus according to claim 8, wherein said corresponding information includes setting contents prescribing a list of said operation keys with corresponding processing functions and pointers indicating the reassignment of said respective operation key to said respective processing function.

10. The processing apparatus according to claim 7, wherein said corresponding information includes setting contents prescribing a list of said operation keys with corresponding processing functions and pointers indicating the reassignment of said respective operation key to said respective processing function.

11. The processing apparatus according to claim 7, wherein said storing means stores a plurality of sets of corresponding information which are different in the corresponding relation between said processing functions and said operation keys.

12. The processing apparatus according to claim 11, wherein said storing means respectively stores corresponding information suitable for simple edition, corresponding information suitable for transmission, and corresponding information suitable for edition, at least.

13. The processing apparatus according to claim 12, wherein simple edition is inserting operation for example.

14. The processing apparatus according to claim 7, wherein a list of functions, which can be assigned to each of said operation keys, is displayed in order to change corresponding relation between said operation keys and said processing functions.

15. A processing apparatus for processing video images, said processing apparatus having a plurality of operation keys, each operation key assigned to one of a plurality of processing functions for processing video images, said processing apparatus comprising:

input/output means for receiving a removably insertable memory card and for storing therein one or more sets of corresponding information indicating a reassignment between a respective operation key and a respective processing function and showing setting contents for prescribing a reassignment of said operation keys and for reading stored corresponding information from said memory card;

display means for displaying a list of functions which can be assigned to each of said operation keys in order to change a corresponding assignment between said image processing functions and said plurality of operation keys, and for displaying present corresponding assignments between said image processing functions and a plurality of operation keys; and means for reassigning said respective operation key to said respective processing function in accordance with said corresponding information read from said memory card by said input/output means apparatus;

wherein, a plurality of users reassign by operation of said means for reassigning said operation keys to said processing functions in accordance with said memory card with different reassignments for each user to thereby prevent erroneous operation of said processing apparatus by said plurality of users.

* * * * *